United States Patent [19]

Ferrio et al.

[11] Patent Number: 4,831,358

[45] Date of Patent: May 16, 1989

[54] COMMUNICATIONS SYSTEM EMPLOYING CONTROL LINE MINIMIZATION

[75] Inventors: Tom M. Ferrio; Carey B. Wilson, both of Lubbock, Tex.

[73] Assignee: Texas Instruments Incorporated, Dallas, Tex.

[21] Appl. No.: 451,989

[22] Filed: Dec. 21, 1982

[51] Int. Cl.$^4$ ............................................. H04Q 1/00
[52] U.S. Cl. ............................. 340/825.5; 340/825.52; 370/85
[58] Field of Search ................. 340/825.04, 825, 825.5, 340/825.52, 825.53; 364/132, 200, 900; 370/85

[56] References Cited

U.S. PATENT DOCUMENTS

| | | | |
|---|---|---|---|
| 3,541,257 | 11/1970 | McCormick et al. | 340/825.52 |
| 4,373,183 | 2/1983 | Means et al. | 340/825.5 X |
| 4,390,969 | 6/1983 | Hayes | 340/825.52 X |
| 4,446,459 | 5/1984 | Bond, Jr. et al. | 340/825.5 X |
| 4,462,084 | 7/1984 | Greenwood | 340/825.5 X |
| 4,472,712 | 9/1984 | Ault et al. | 340/825.5 |
| 4,486,750 | 12/1984 | Aoki | 340/825 |

Primary Examiner—Ulysses Weldon
Attorney, Agent, or Firm—William E. Hiller; N. Rhys Merrett; Melvin Sharp

[57] ABSTRACT

A communications system employs a multiline bus including control lines for multiple functions in order to minimize the required number of bus lines. This technique is most applicable to small computer systems which are hand portable or briefcase portable and which operate with small peripherals. The transmitting device places an active signal on a handshake line for a predetermined period of time. The receiving device detects this active signal and also places an active signal on the handshake line. The transmitting device applies valid data to the data lines throughout the period that a active signal is on the handshake line. Upon detection of the data the receiver releases the handshake line. Using this technique a single line is used to indicate valid data transmission and proper reception. An additional bus available line, used by a master device to alert slave devices that communications are in process, can be employed by at least some of the slave devices to request service from the master device.

6 Claims, 4 Drawing Sheets

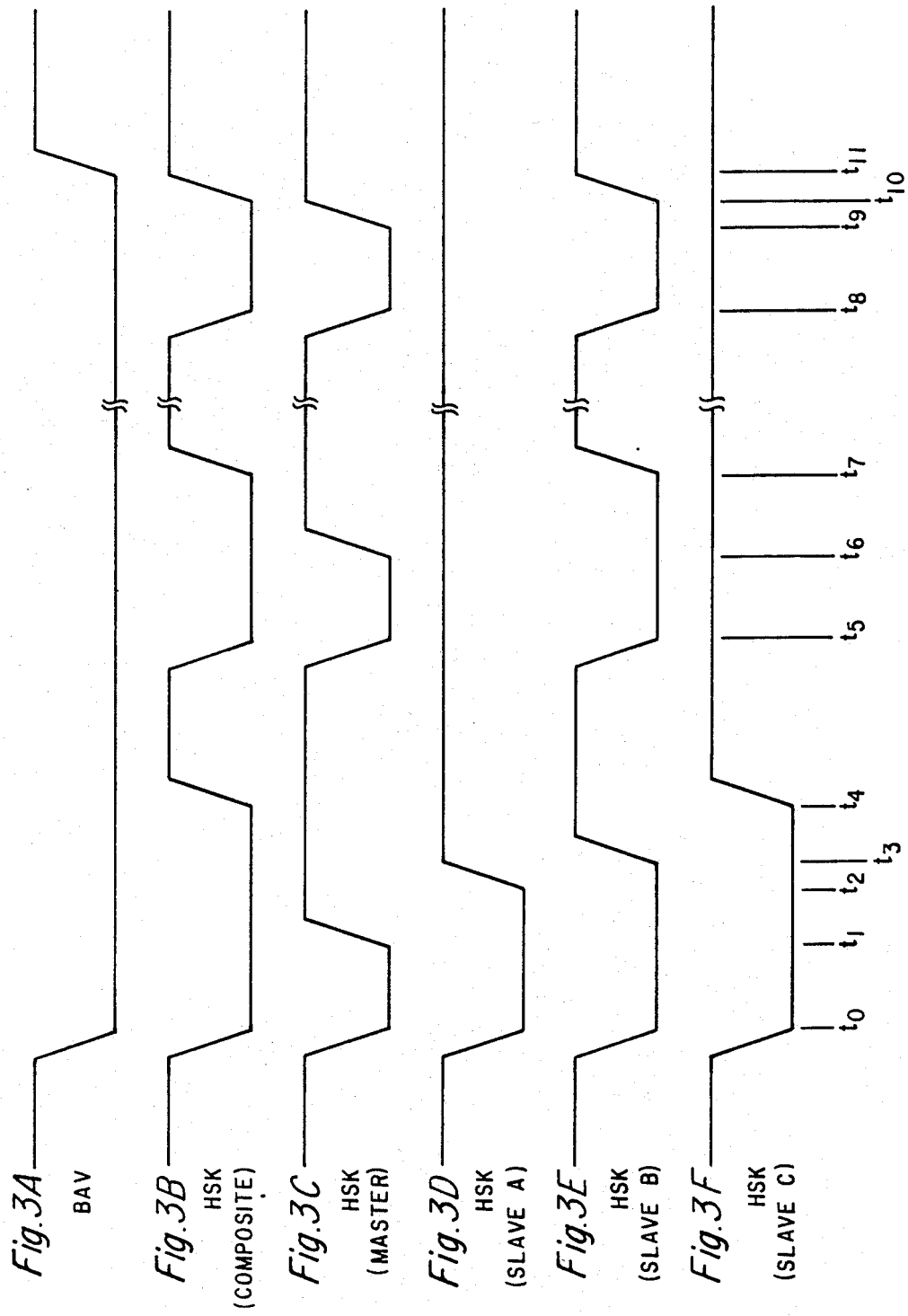

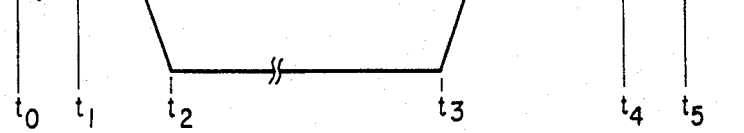
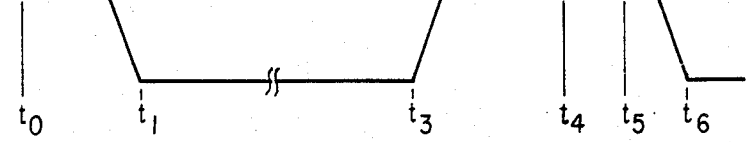

COMMUNICATIONS SYSTEM EMPLOYING CONTROL LINE MINIMIZATION

BACKGROUND OF THE INVENTION

The present invention relates principally to small computing systems and compatible peripherals, specifically to hand portable or briefcase portable systems. Due to the ongoing trend to increasing computer power and decreasing computer size and cost, a new category of computers has entered the market, that of the hand portable or briefcase portable computer. This new class of data processing apparatus performs all of the functions normally associated with data processing apparatuses such as input, computation and output, and includes the capability of interact with peripheral devices. These peripheral devices may include mass memory devices, additional input devices and additional output devices.

This new category of data processing apparatus presents unique problems of data communications. Because the data processing apparatuses themselves are small and light in weight and will ordinarily be mated with peripherals which are similarly small in size and light in weight, these systems require a communications bus structure which provides an adequate rate of data exchange with a minimum of required data and/or control lines. In general, there is a trade off between the number of individual lines included within such a communications bus and the speed at which data may be communicated. The greater the number of communication lines, the greater the data rate capacity of the communications system. In addition to data lines for exchange of data, the communications bus must include additional lines for transmission of control signals indicating the beginning of a message and the indication of when data upon the data lines is valid. Typically such a system requires one or more lines of the communication bus dedicated for indicating the pendency of communication and a further plurality of communication lines for indicating when transmitted data is valid and indicating the proper receipt of transmitted data.

Because of the known relationship between the number of data lines and the speed of data transmission, the engineering choice between complexity and speed of transmission is well known. However, if the number of control lines could be minimized by causing one or more of these control lines to perform a plurality of functions while retaining the use of only digital signals, a new advantageous engineering tradeoff between complexity and speed of data transfer could be achieved.

SUMMARY OF THE INVENTION

It is an object of the present invention to provide a communications bus system particularly adapted for use with small, portable data processing apparatuses and their associated perhipherals which minimizes the requirement for control lines and the control interchange in order to enable an improved engineering tradeoff between bus complexity and speed of data exchange. This minimization is achieved by having each control line serve more than one function.

In a preferred embodiment of the present invention a handshake line is employed to indicate when the transmitting device provides valid data to the data lines. The transmitting device initially places a predetermined voltage on this handshake line for a predetermined period of time, while simultaneously transmitting valid data on the data lines. At the end of this predetermined period of time, the transmitting device no longer retains the handshake line at the predetermined voltage. Each device to which the communication is directed includes a means for sensing the voltage upon this handshake line. Upon detection of the predetermined voltage on the handshake line, each such peripheral device also places the predetermined voltage on the handshake line. Each peripheral device detects the data upon the data lines. After completion of detection of the signals upon the data lines, the peripheral device then disconnects the predetermined voltage from the handshake line. Thus the handshake line remains at the predetermined voltage until the last peripheral to complete detection of the data on the data lines has completed this detection. The transmitting device also includes a sensor to determine the voltage on the handshake line and specifically to determine when the handshake line has been disconnected from the predetermined voltage by all apparatuses attached to the bus. At this point the transmitting device removes the data signal from the data lines, and thereafter the signals on the data lines are no longer valid. The transmitting device remains in this state until the next data transmission.

In a still further embodiment of the present invention the communications bus includes a bus available line which is employed by a master device to alert all of a group of slave devices that communications are in process. In such a system, at least some of the slave devices may be permitted to signal the master device requesting device service. In accordance with the present invention this service request is made by the slave device by placing a predetermined voltage on the bus available line, in the same manner that the master device places a predetermined voltage on the bus available line to indicate communications are in process. Upon detection of this slave signal on the bus available line, the master device then takes a poll of those slave devices which are permitted to make service requests to determine which slave device made the service request. Upon identification of the requesting slave device, communication is established between the master and slave in order to properly service the slave device.

BRIEF DESCRIPTION OF THE DRAWINGS

The above and other objects and aspects of the present invention will become clear from the following detailed description taken in conjunction with the drawings in which:

FIGS. 3(A)-3(F) illustrates signal diagrams of the handshake communications protocol in accordance with the present invention;

FIGS. 4(A)-4(D) illustrate one case of the signals when a slave device initiates a service request in accordance with the present invention; and FIGS. 5(A)-5(D) illustrate the signals in a further case in which a slave device initiates a service request.

DETAILED DESCRIPTION OF THE PREFERRED EMBODIMENT

Figure 1:
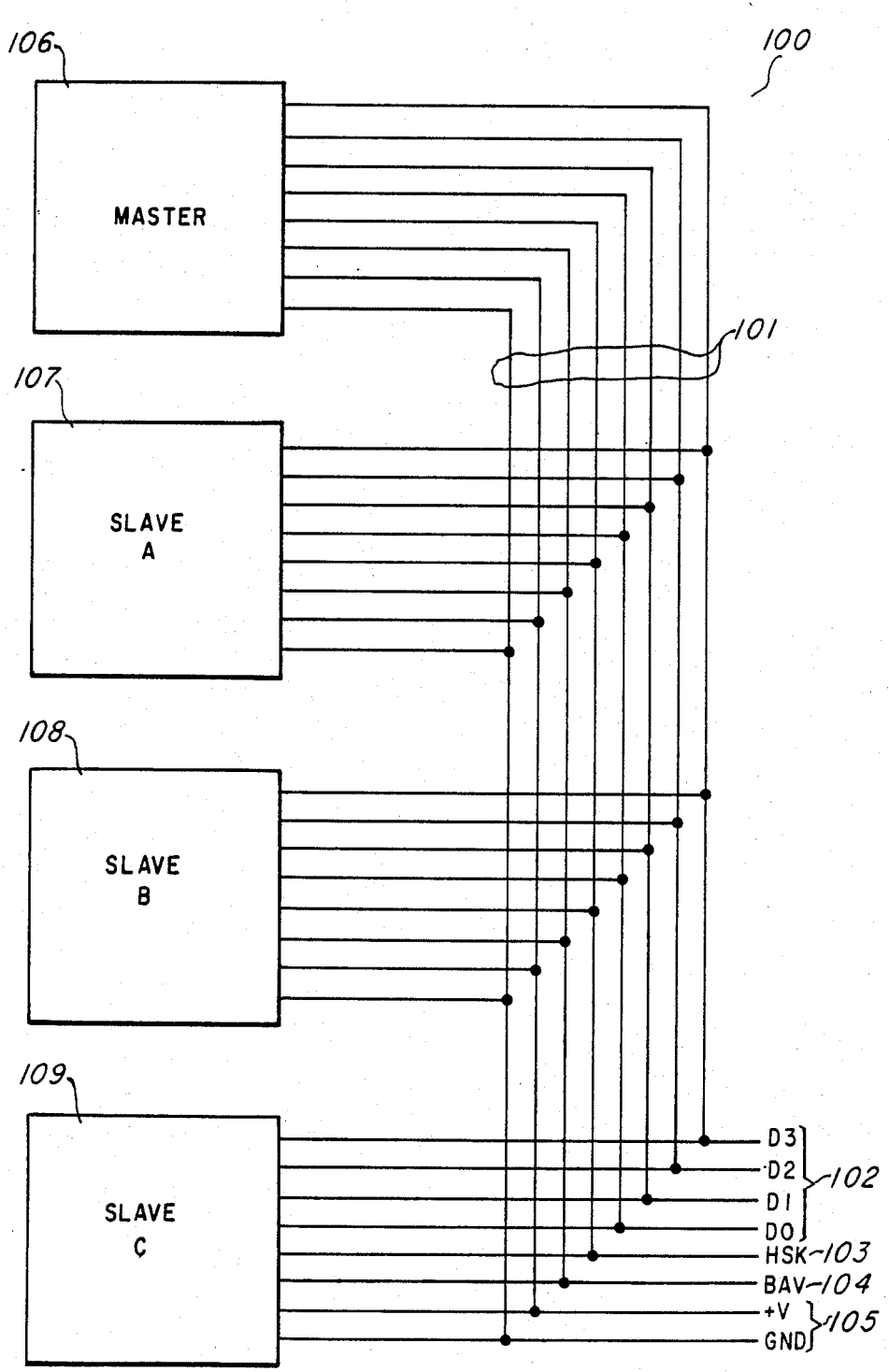
FIG. 1 illustrates a block diagram of the communications system in accordance with the present invention.

FIG. 1 illustrates a block diagram of a communications system constructed in accordance with the present invention. The communications system 100 includes communications bus 101 and several devices connected to the lines of communications bus 101 in parallel.

Communications bus 101 includes a plurality of separate bus lines. These separate bus lines include a plurality of data lines 102. FIG. 1 illustrates these data lines as including data lines D0, D1, D2 and D3. As illustrated, communications bus 101 simultaneously transmits four bits of data. It would be well understood by those skilled in the art that communications bus 101 may include a greater number or lesser number of data lines for transmission of a greater number or lesser number of data bits simultaneously.

Communications bus 101 further includes additional control and reference voltage lines. Communications bus 101 includes handshake line 103. As explained in greater detail below, handshake line 103 is employed by the devices connected to communications bus 101 to control the period during which the data applied to data lines 102 by the transmitting device is valid. Communications bus 101 also includes bus available line 104. Bus available line 104 is employed by one of the devices connected to communications bus 101 (designated as the master device) to communicate to the other devices connected to communications bus 101 (designated as slave devices) that communications exchange is in process. In addition, in accordance with one embodiment of the present invention which will be further described below, certain of the slave devices are enabled to signal the master device for a service request via this bus available line 104. Lastly, communications bus 101 includes reference voltage lines 105 including a positive voltage reference and ground.

Communications system 100 illustrates master device 106, slave device A 107, slave device B 108 and slave device C 109. In accordance with the teachings of the present invention each of these devices is connected in parallel to each of the lines of communications bus 101. In such an arrangement each device is sensitive to the signals placed upon any of the lines of communications bus 101 by any other device. Thus each device may be either a transmitter or a receiver, depending upon the particular communications taking place.

Figure 2:
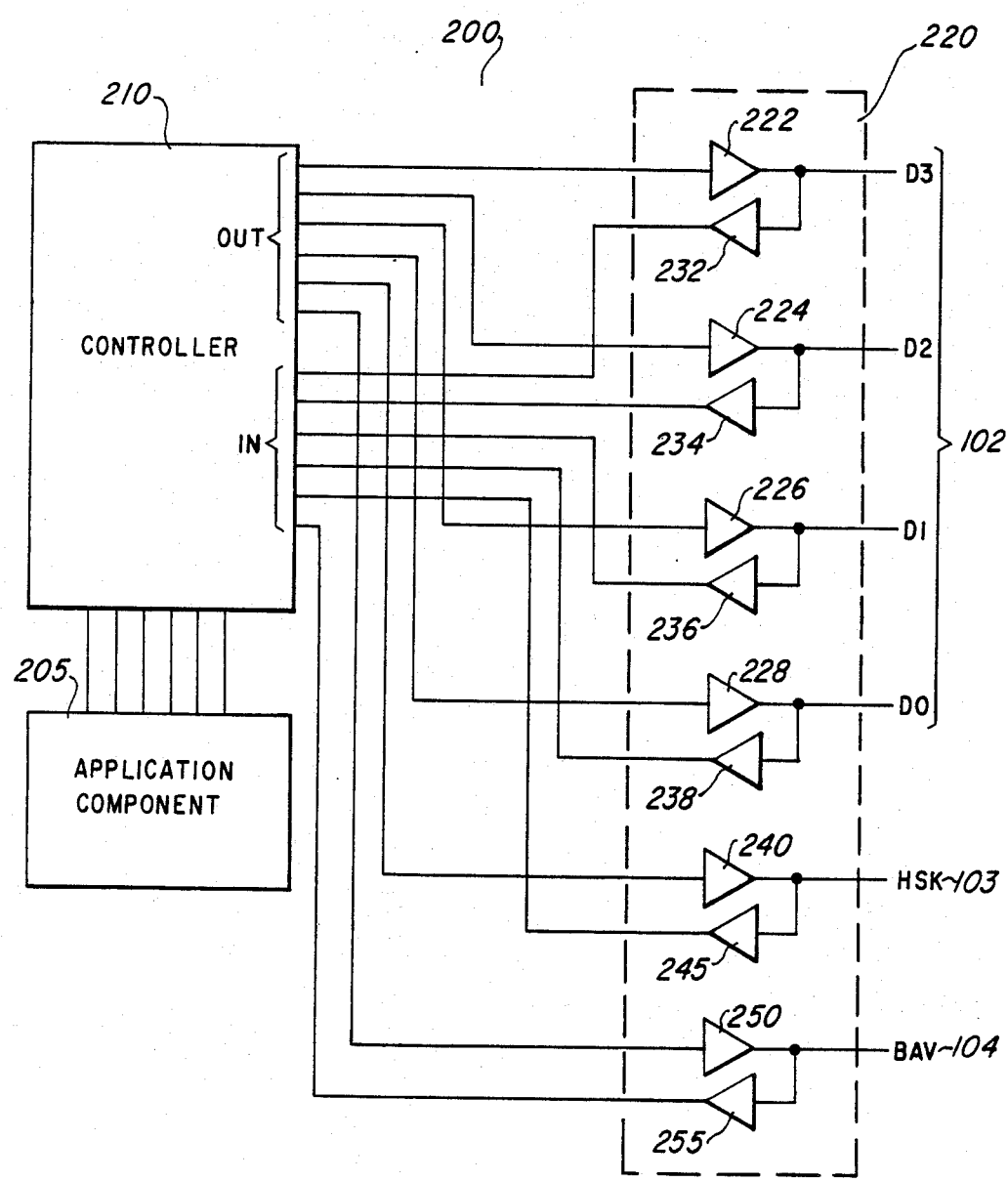
FIG. 2 illustrates the bus interface components of each device connected to the communications bus.

FIG. 2 illustrates in block diagram form the components of device 200 such as may be connected to the communications bus 101. Each device such as master 106, slave A 107, slave B 108 and slave C 109 may be constructed in accordance with the matter illustrated in FIG. 2.

Device 200 includes three major parts. The major component of device 200 is applications component 205. Applications component 205 may be a memory device, an output device, an input device, a machine controller or the like. This major component 205 is the actual operating part of the device 200 as opposed to the other components illustrated in FIG. 2 which are employed in control. It will be well understood by those skilled in the art that the communications system described in the present application can be used with a wide variety of application components 205, and therefore it is not necessary to further describe this element.

Controller 210 supervises the exchange of data between applications component 205 and communication line buffers 220. Controller 210 is responsive to signals from input buffers and applies signals to output buffers in order to properly respond to signals appearing on communications bus 101. In addition, controller 210 includes logic for controlling the exchange of information in accordance with the present invention. Although controller 210 can be constructed of special purpose logic, it is considered desirable that controller 210 be constructed of a one chip microprocessor together with one or more associated read only memory chips or by a single chip microcomputer which includes read only memory. In accordance with principles well known to those skilled in the art, a controller program is placed within the read only memory of such a combination in order to perform the required logic functions in accordance with the present application.

Buffers 220 comprise the interface between the device 200 and communications bus 101. Buffers 220 includes output buffers 222, 224, 226 and 228 which provide outputs on respective ones of data line 102. Also coupled to data lines 102 are respective input buffers 232, 234, 236 and 238. Output buffer 240 couples output from device 200 to handshake line 103 while input buffer 245 provides inputs to device 200 from handshake line 103. Similarly, device 200 is coupled to bus available line 104 via output buffer 250 and input buffer 255.

As explained below in conjunction with FIGS. 3(A) to 3(F), it is considered desirable to employ a negative logic convention, that is a convention in which a high voltage corresponds to an inactive state and a low or ground voltage corresponds to a an active state. Because output buffers 222, 224, 226, 228, 240 and 250 of the illustrated device 200 are placed upon the lines of communication bus 101 in parallel with other output buffers and input buffers of other devices, it is necessary to enable any buffer on any one of the communications lines to insure that an active state is placed upon this communication line regardless of the states of any of the other output buffers coupled to this communication line. This may be achieved by providing an active signal at a low or ground voltage and an inactive signal at a higher voltage. In order to permit any output buffer coupled to a particular communications line to achieve the low voltage or ground active state, it is necessary that all of the output buffers connected to the communications line have a high impedance output in the inactive state. This may be achieved by employing an open collector output, in the case in which the output buffers are embodied by bipolar semiconductor devices, or an open drain output, in the case in which the output buffers are embodied in metal oxide semiconductor devices.

The operation of the present invention in conjunction with the handshake line will now be described in detail in conjunction with the signal diagrams appearing in FIGS. 3(A) to 3(F). FIGS. 3(A) to 3(F) illustrate a simplified example of communications in accordance with the present invention. FIGS. 3(A) to 3(F) illustrate signals, each employing the negative logic convention, that is, the inactive state is a high voltage and the active state is a low voltage. FIG. 3(A) illustrates the signal appearing on the bus available line. FIG. 3(B) illustrates the composite signal appearing on handshake line 103. FIGS. 3(C)-(F) illustrate the inputs to output buffers 240 of the master device and slave devices A-C, respectively.

Communications are initiated by the master device which applies a predetermined voltage, such as ground, to the bus available line 104 via output buffer 250. The input buffers 255 of each of the slave devices sense this change of state at time t0 in order to actuate their respective devices. Also occurring at time t0 or at some interval thereafter, the output buffer 240 of the master device applies the predetermined voltage to handshake line 103 in order to bring handshake line 103 to the active state (illustrated at FIG. 3(C)). This transition from high to low on handshake line 103 is sensed by the input buffers 245 of each of the slave devices. Each of the slave devices responds to this detection of the active state on handshake line 103 by actuating its output buffer 240 to also apply the active state to handshake line 103, as illustrated in FIGS. 3(D) to 3(F). This response by the slave devices may be accompanied by a short delay which is not illustrated in FIGS. 3(D) to 3(F).

In accordance with the present invention the master device applies the predetermined voltage to handshake line 103 only for a predetermined period and after time t1 the master device no longer applies the active state to handshake line 103. However, as noted above, each of the slave devices has also applied the active signal to handshake line 103. Therefore handshake line 103 composite signal illustrated in FIG. 3(B) retains the active state.

Simultaneously with the application of the active state to handshake line 103 by the master device, the master device also applies validated data signals to the data lines 102 of communications bus 102 via output buffers 222, 224, 226 and 228. The output data may be any digital state which can be transmitted via data lines 102. This output data is not illustrated. The active state of the handshake line serves as an indication to all receiving devices that the signals appearing on data lines 102 are valid. At the end of the predetermined period of application of the active signal to handshake line 103 by the master device at time t1, handshake line 103 continues to be in the active state due to the application of the active state signal from each of the slave devices as illustrated in FIGS. 3(D), 3(E) and 3(F). Input buffer 245 of the master device detects this active state on handshake line 103 and continues application of valid signals to data lines 102.

At time t2, slave device A completes detection of the signals appearing on the data lines 102 and therefore releases application of the active signal to handshake line 103. However, because the active signal is still applied to handshake line 103 by slave device B and slave device C the composite signal on handshake line 103 remains at the active level. At time t3, slave device B completes detection of the data signals applied to data lines 102. Thereafter, in a manner similar to that described above in relation to slave device A, slave device B releases application of the active signal to handshake line 103. Thereafter the active signal is retained upon the handshake line only via slave device C. At time t4 slave device C completes detection of the data signals applied to data lines 102 and releases application of the active signal from handshake line 103. At that time handshake line 103 is no longer retained at the active level and therefore goes to the inactive level starting at time t4. Upon detection of this release of handshake line 103 from the active level, the master device no longer applies valid data signals to data lines 102.

In accordance with the present invention, the first data sent by the master device upon initiating communications corresponds to a device code. Each of the slave devices includes a predetermined device code by which that particular slave device may be identified. The master device determines the particular slave device to which the communications are directed and then initially transmits data corresponding to the device code of that particular slave device. After transmission of this device code, slave devices whose device codes do not correspond to this transmitted device code no longer take part in the communications protocol until bus available line 104 goes inactive and then active again. That is, such slave devices no longer sense the signals on the handshake line and no longer apply the active signal level to the handshake line upon detection of the active signal level.

In the simplified example illustrated in FIGS. 3(A) to 3(F) it is assumed that the device code has no more bits than the number of data lines and thus can be transmitted in a single handshake cycle. If the device code has a greater number of bits than the number of data lines then a plurality of handshake cycles would be required to transmit the device code. In such an event each slave device must take place in all handshake cycles until the entire device code is transmitted. In addition it is desirable to designate a device code recognized by all devices so that the master device may signal all slave devices simultaneously.

In the communication illustrated in FIGS. 3(A) to 3(F), the transmitted device code corresponded to slave device B. Therefore, only slave device B transacts further communication with the master device.

After transmission of the device code, the master device is ready to transmit data and/or commands to the slave device identified by the previously transmitted device code. The simplified example of FIGS. 3(A) to 3(F) illustrate only a single handshake cycle for this purpose, however, those skilled in the art would recognize that a plurality of handshake cycles could be employed for this purpose. Therefore, the master device places the active signal on handshake line 103 at time t5. In accordance with the teachings above, master device retains this active signal on handshake line 103 only for a predetermined period until time t6. Upon recognition of the application of the active signal to handshake line 103, the addressed slave device B also applies the active signal to handshake line 103. Note that the unaddressed slave device A and slave device C no longer take part in this handshake exchange. As described above in conjunction with the initial data, slave device B retains handshake line 103 at the active level until it completes detection of the data sent by the master device. Thereupon at time t7 slave device B releases handshake line 103 from the active level thereby causing handshake line 103 to go to the inactive level.

A consequent advantage of this handshake protocol can be seen by comparison of the first data transmitted and the second data transmitted. In the case of the first data transmission, the slowest device to recognize the data applied to data lines 102 was slave device C. Because slave device C took control of handshake line 103 and continued to apply the active signal to handshake line 103 until time t4 when slave device C completed recognition of the data appearing on the data lines 102, this initial data communication takes place at the speed of the slowest device. Note also that because of this combination of devices for holding handshake line 103 at the active signal level and thereby causing the transmitting device to continue to transmit valid data to the data lines 102, it is not necessary for the transmitting device to automatically continue to apply the valid data signals to the data lines 102 for a predetermined period selected longer than the recognition period of the slowest device. This is because the device which is slowest to recognize the data signals transmitted by the transmitting device signifies completion of such recognition via release of application of the active signal to handshake line 103, when recognition has taken place. Therefore the predetermined period during which the transmitting device holds handshake line 103 at the active signal level need only be sufficiently long to enable every device to recognize the active signal level applied to handshake line and to also apply the active signal level to the handshake line.

The initial transmission of the device code requires a time equal to the recognition time of the slowest device applied to the communication bus, which time is communicated to the transmitting device. After transmission of the device code, only the addressed device attached to the communications bus takes part in the handshake signal exchange. Therefore in the case of the transmission of the first data signals to the addressed slave device, the interval between time t5 and t7 is less than the interval between t0 and t4, this shorter interval corresponding to the shorter data recognition time of the addressed slave device.

FIGS. 3(A) to 3(F) illustrate the case in which the addressed slave device must transmit some data back to the master device, such as the case of read command transmitted to a mass memory. Note that while FIGS. 3(A) to 3(F) illustrate the case in which this return transmission can be completed by a single handshake cycle, in general the slave device would require a plurality of such handshake cycles, all under the control of the slave device, to complete the desired data transmission. This is illustrated in FIGS. 3(A) to 3(F) from time t8 to t11. At time t8 slave device B applies the active signal level to handshake line 103 and holds this active signal level for a predetermined period until time t10. In the manner described above, the master device senses this application of the active signal level to handshake line 103 and causes its output buffer 240 to also apply the active signal level to handshake line 103. In this case it requires a period only until t9 for the master device to recognize and validly detect the data applied to data lines 102. Therefore at time t9 the master device releases this application of the active signal level to handshake line 103. However, this period is shorter than the predetermined period of initial application of the active signal by slave device B upon transmission of the data. Therefore, the slave device B continues to apply the active signal level to handshake line 103 until time t10. Upon release of this application of the active signal level to handshake line 103, the signal upon handshake line 103 returns to the inactive level. This transaction illustrates the point that it is the slowest device which controls the speed of data exchange. In such a case the transmitting slave device B, which has a predetermined handshake line transition period from time t8 to t10, is the slowest device. Because the master device can recognize the valid data applied to data lines 102 in a shorter period than this time period, the data transmission is complete at the end of the predetermined period of slave device B.

In this simple example, the completion of the return transmission from slave device B to the master device completes the entire communications required. Therefore, at time t11 the master device releases application of the active signal level to bus available line 104. Thereafter, the signal on bus available line 104 goes to the inactive signal level. This resets all slave devices so that all slave devices will take part in any communication following a subsequent active state on bus available line 104, at least until transmission of the device code.

FIGS. 4(A) to 4(D) illustrates the normal case in which a slave device has requested service from the master device. FIG. 4(A) illustrates the composite signal on bus available line 104 during this slave service request. FIG. 4(B) illustrates the input applied to output buffer 250 of the requesting slave device. To communicate the service request to the master device, the slave device employs bus available line 104. The slave device places an active state signal on bus available line 104 at time t0. The master device recognizes this active state applied to bus available line 104, also applies an active state to bus available line 104 at time t1 (illustrated in FIG. 4(C) and further applies an active state signal to handshake line 103 at time t2 (illustrated in FIG. 4(D)). Upon detection of the application of an active state signal to handshake line 30, the slave device releases application of the active state signal to bus available line 104. Because the master device has now taken control of bus available line 104, the composite signal applied to bus available line 104 (illustrated in FIG. 4(A)) remains in the active state.

The master device now initiates a poll of all those slave devices which are permitted to generate service requests. This polling of these slave devices is accomplished by transmitting on the data lines the device code corresponding to one of these possible slave devices. This transmission of the device code takes place in the manner fully illustrated and explained in conjunction with FIGS. 3(A) to 3(F). If the addressed slave device is not the slave device which initiated the service request, then the slave device returns data to the master indicating that it was not the requesting device. The master device then concludes this communication by releasing the active state applied to handshake line 103 and bus available line 104 at time t3. This recycles all the slave devices so that they will take part in any handshake exchange following the next application of the active state to bus available line 104.

The requesting slave device, whose request has not been serviced, waits a predetermined period after bus available line 104 goes inactive and then repeats the service request at time t4. The master device handles this as before by taking control of bus available line 104 at time t5 except the master transmits the device code of another one of the possible slave devices. This sequence continues until the requesting slave device is polled. Thereafter, the slave device communicates the requested service to the master device and this request is handled by the master device.

Due to timing uncertainty, a slave device may apply the active state signal to bus available line 104 nearly simultaneously with the application of the active state signal to this communication line by the master device in conjunction with the commencement of a normal communication. Such a case is illustrated in FIGS. 5(A) to 5(D) in which both master and slave apply an active state signal to bus available line 104 at time t0. If this occurs, it is possible that the master device will not be able to recognize that the slave device has generated a service request. This is because the application of the active state signal to bus available line 104 by the master device may mask the similar application of the active state signal to bus available line 104 by the requesting slave device. In such a case the normal communication initiated by the master device will continue in the manner illustrated in FIGS. 3(A) to 3(F). The requesting slave device releases application of the active state signal to bus available line 104 upon detection of the active state signal on handshake line 103 at time t1 as in the normal case. However, because the master device is in the midst of another communication, the master device does not generate a polling message but rather continues with the intended communication. This communication is handled normally even if this communication is coincidentally addressed to the requesting slave device. A predetermined period after the end of this communication controlled by the master device, as indicated by the release of bus available line 104 from the active state at time t3, the slave device will then reinitiate its service request by again applying the active state to bus available line 104 at time t4. This renewed service request causes the master to apply an active state signal to bus available line 104 at t5 and to handshake line 103 at t6. The requesting slave device will continue to initiate such rerequests a predetermined period of time after the end of any communication controlled by the master, until this slave device receives the polling message from the master.

What is claimed is:

1. A communications system comprising:

a communications bus having a plurality of data lines and a handshake line;

a master device coupled to said communications bus having (A) a master transmit/receive controller for placing said master device in a transmit mode or a receive mode, (B) a master handshake receiver for generating a data output signal when said handshake line has a predetermined voltage when in said transmit mode and for generating a start signal upon initial application of said predetermined voltage to said handshake line when in said receive mode, (C) a master data transmitter for placing a selected set of signals on said data lines when said data output signal is generated, (D) a master data receiver for initiating detection of the signals on said data lines upon generation of said start signal and for generating a stop signal upon successful detection of said signals on said data lines, and (E) a master handshake transmitter for selectively connecting said predetermined voltage to said handshake line for a predetermined interval of time when in said transmit mode and for selectively connecting said predetermined voltage to said handshake line during the interval from said start signal to said stop signal when in said receive mode;

at least one slave device coupled to said communications bus including (A) a slave transmit/receive controller for placing said slave device in a transmit mode or a receive mode in response to data received from said master device, (B) a slave handshake receiver for generating a data output signal when said handshake line has said predetermined voltage when in said transmit mode and for generating a start signal upon initial application of said predetermined voltage to said handshake line when in said receive mode, (C) a slave data transmitter for placing a selected set of signals on said data lines when said data output signal is generated, (D) a slave data receiver for initiating detection of the signals on said data lines upon generation of said start signal and for generating a stop signal upon successful detection of the signals on said data lines, and (E) a slave handshake transmitter for selectively connecting said predetermined voltage to said handshake line for a predetermined interval of time when in said transmit mode and for selectively connecting said predetermined voltage to said handshake line during the interval from said start signal to said stop signal when in said receive mode;

said communications bus further including a bus available line;

said master device further including a bus available transmitter for selectively connecting said predetermined voltage to said bus available line during communications;

each of said slave devices further including a bus available receiver for enabling said slave transmit/receiver controller, said slave handshake receiver, said slave data transmitter, said slave data receiver and said slave handshake transmitter when said bus available line has said predetermined voltage;

each of said slave devices having a unique device code and each slave device further including a device code comparator for comparing data detected by said slave data receiver with said device code and for enabling said slave handshake receiver and said slave handshake transmitter when data detected by said slave data receiver corresponds to said unique device code;

at least one of said slave devices further including a slave bus available line transmitter for selectively connecting said predetermined voltage to said bus available line to signal a service request; and said master device further including a master bus available receiver for causing said master device to initiate communications and to transmit the device code of a selected one of said slave devices permitted to initiate service requests and a polling message upon detection of said predetermined voltage on said bus available line.

2. A communications system as claimed in claim 1, wherein:

said at least one slave device further includes means for causing said slave bus available transmitter to repeat selective connection of said predetermined voltage to said bus available line a predetermined period after said bus available line is disconnected from said predetermined voltage, if said slave device does not receive the corresponding device code and a polling message.

3. A communications system as claimed in claim 1, wherein:

said at least one slave device includes means for causing said slave data transmitter to transmit a "not requesting device" message to said data lines if said slave device receives a polling message and has not previously signalled a service request.

4. A communications device for connection to a communications bus including at least one data line, a handshake line, and a bus available line, said communications device comprising:

a transmit/receiver controller for placing said device in a transmit mode or a receive mode;

a handshake receiver adapted for connection to said handshake line for generating a data output signal when said handshake line has a predetermined voltage when in transmit mode and for generating a start signal upon initial application of said predetermined voltage to said handshake line when in receive mode;

a data transmitter adapted for connection to said data lines for placing a selected set of data signals on said data lines when said data output signal is generated;

a data receiver adapted for connection to said data lines for initiating detection of the signals on said data lines upon generation of said start signal and for generating a stop signal upon successful detection of said signals on said data lines;

a handshake transmitter adapted for connection to said handshake line for selectively connecting said predetermined voltage to said handshake line for a predetermined interval of time when in said transmit mode and for selectively connecting said predetermined voltage to said handshake line during the interval between said start signal and said stop signal when in said receive mode;

a bus available receiver for enabling said transmit/receive controller, said handshake receiver, said data transmitter, said data receiver and said handshake transmitter upon detection of said predetermined voltage on said bus available line;

a device code comparator for comparing data received by said data receiver with a predetermined unique device code and for enabling said handshake receiver and said handshake transmitter when data received by said data receiver corresponds to said unique device code; and a bus available transmitter for selectively connecting said predetermined voltage to said bus available line to signal a service request.

5. A communications device as claimed in claim 4, further comprising:

means for causing said bus available transmitter to repeat connection of said predetermined voltage to said bus available line a predetermined period after said bus available line is disconnected from said predetermined voltage if said communications device does not receive via said data receiver said unique device code and a polling message.

6. A communications device as claimed in claim 4, further comprising:

means for causing said data transmitter to transmit a "not requesting device" message to said data lines if said communications device receives a polling message and has not previously signalled a service request.

* * * * *